United States Patent [19]
Klein

[11] Patent Number: 5,926,598
[45] Date of Patent: Jul. 20, 1999

[54] APPARATUS FOR BREAKING OUT RIBBONIZED FIBER OPTIC CABLES

[76] Inventor: Dennis Klein, 605 Elizabeth La., Des Plaines, Ill. 60018

[21] Appl. No.: 08/872,237

[22] Filed: Jun. 10, 1997

[51] Int. Cl.$^6$ .................................................... G02B 6/36
[52] U.S. Cl. ............................................ 385/137; 385/147
[58] Field of Search ................................. 385/114, 147, 385/137, 65, 83, 134

[56] References Cited

U.S. PATENT DOCUMENTS

| | | |
|---|---|---|
| 3,575,329 | 4/1971 | Hannabery . |
| 4,046,045 | 9/1977 | Stevens . |
| 4,046,298 | 9/1977 | Shroeder, Jr. . |
| 4,179,964 | 12/1979 | Kirkgasser et al. . |
| 4,267,757 | 5/1981 | Frantz . |
| 4,522,097 | 6/1985 | Adlon et al. . |
| 5,524,166 | 6/1996 | Osaka et al. ............................ 385/134 |
| 5,574,817 | 11/1996 | Henson et al. ........................... 385/114 |
| 5,685,945 | 11/1997 | Mock et al. . |

*Primary Examiner*—Hung N. Ngo
*Attorney, Agent, or Firm*—Wallenstein & Wagner Ltd.

[57] ABSTRACT

A fiber optic cable ribbon breakout apparatus comprises first and second die members disposed in opposing relationship to each other. Each die member has a plurality of slots formed into one its surfaces which are adapted to receive a portion of the cable ribbon. For each die member, each slot has depth differing from the depths of the other slots of that member in order to effect a break out of the ribbon at any fiber desired. The slots of the second die member may have a width greater than that of the slots of the first die member. A frame may be provided which includes a first side member and a second side member to contain the die members. Each side member has a keyway into which corresponding keys located at the ends of the die members may be slidably engaged. The first die member is adapted for translational displacement between the side members. A spring may be provided to bias the first die member against one of the side members. In this biased position, the corresponding slots of the die members may be opposingly aligned to permit containment of a single fiber optic cable ribbon. The keys on the ends of the second die member may have different dimensions in order to ensure proper alignment of the slots. Translational displacement of the first die member relative to the second die member causes the first portion of a cable ribbon loaded into the apparatus to separate from the remaining portion of the ribbon at a desired point.

24 Claims, 5 Drawing Sheets

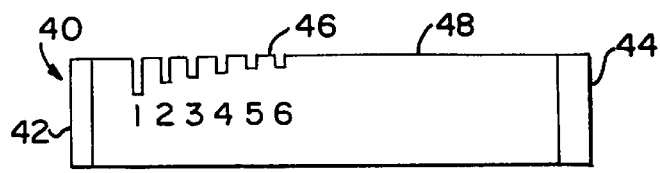
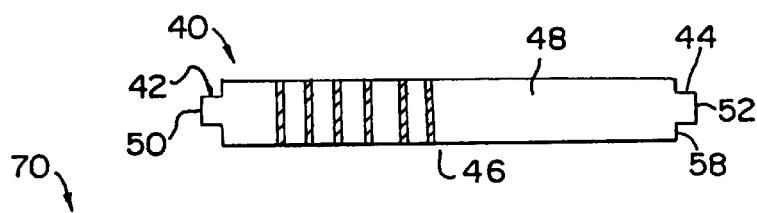
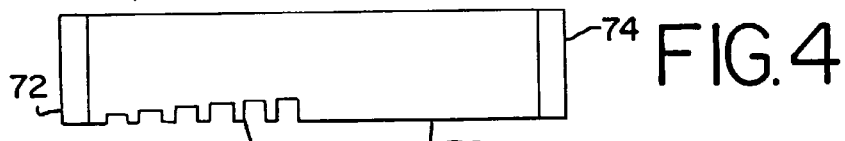
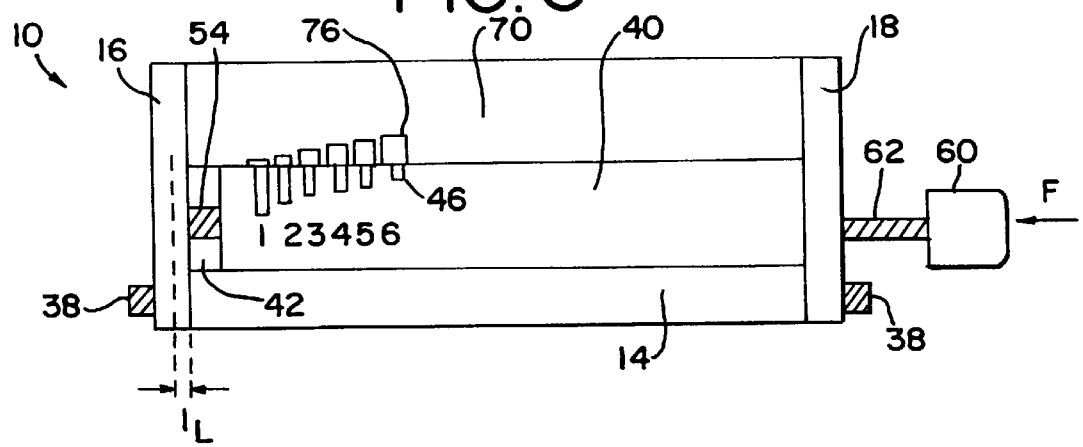
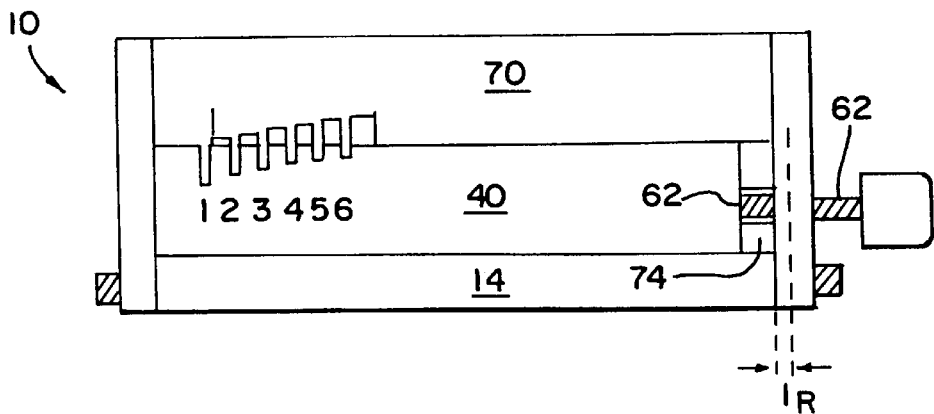

APPARATUS FOR BREAKING OUT RIBBONIZED FIBER OPTIC CABLES

TECHNICAL FIELD

The following disclosure relates generally to the field of data transmission by optical fibers. More particularly, the invention herein disclosed relates to procedures requiring the accessing of one or more individual or discrete optical fibers at a mid-span point or other location within a ribbonized fiber optic cable.

BACKGROUND OF THE INVENTION

The theory and practice of transmitting data via optical waveguide fibers is well-known in the communications industry. Such fibers, usually composed of a glass or other transparent, refractory material, serve advantageously as a medium for guiding coherent light expressing data over long distances. Guided transmission of propagating light waves has been made possible by embedding or surrounding the glass material of a given refractive index with a different material having a lower refractive index. Relatively recent innovations in the manufacturing of fiber optic cables and improvements in the compositions utilized, such as fused silica doped with titania, have resulted in tighter control of the angles of incidence at which light waves propagate within the fibers to ameliorate the inefficient "bouncing" profile exhibited by the wave propagation. Thus, greater integrity of transmitted discretized data pulses has been achieved.

Fiber optic cables can be produced in a ribbonized configuration wherein a row of drawn optical fibers are grouped in parallel with each other and clothed in a mylar matrix. In the United States, the twelve-fiber ribbon has become the standard, while in European and Asian countries the standard is between four and twenty-four fibers per ribbon. For service and maintenance purposes, it often becomes necessary to perform splicing and termination operations on individual or discrete fibers of the optical fiber ribbon. Before performing such operations on a particular fiber within the optical fiber ribbon, it may become necessary to access a discrete fiber by removing it from the optical ribbon without disturbing or damaging the other fibers. Various strategies for splitting or breaking out fibers have been developed, all of which are considered to be deficient.

One frequently used method for breaking out discrete fibers has been to employ chemicals such as butyl-ethyl acetates to degrade the matrix. These chemicals require careful handling by technicians as they are biologically injurious. Moreover, the chemicals are expensive, have limited shelf life, and pose environmental hazards.

Another method has required the use of scratching means to produce scores on the surface of the matrix prior to breaking out the fibers. For example, U.S. Pat. No. 5,524,166, issued to Osaka et al., discloses a tool for separating a multi-core ribbon. The tool uses a plurality of pins to form scratches on the matrix by clamping down on the ribbon and pulling the ribbon along the pins in the longitudinal direction of the fibers. The flats of the ribbon are then sandwiched between alternating, opposing shearing force application members which, when driven toward the ribbon, induce breaks in the matrix along the scratch lines to separate out the fibers. A ribbon may be split in this manner into a number of divisional states—e.g., in a twelve-fiber ribbon all twelve fibers may be separated, or three groups of four fibers, or four groups of three fibers, etc. However, realization of the desired divisional state requires selecting the appropriate pin configuration, and when a different divisional state is sought the pin configuration must be modified.

The several embodiments depicted in Osaka et al., contemplate an excessive number of complex, bulky machined components and an excessive number of method steps. In addition, the use of scratching pins carries an unacceptable risk of damaging the optical fibers in the matrix. It is well known to a skilled professional within the field that optical fibers are extremely sensitive to scratching even when the scratching does not break the fibers. Even a slight scratch or other defect on the surface of an optical fiber may create a number of unwanted conditions, such as dislocations in the fiber's crystalline structure and/or a change in the refractive index contrast. These and other adverse conditions can result in inferior transmission of data. For even minimal scratching on the surface of optical fibers may produce a scattering effect on light waves propagating therethrough, thereby corrupting the data being transmitted.

The deficiencies of such prior art embodiments are also evident in U.S. Pat. No. 4,046,298, issued to Schroeder, Jr., which discloses a relatively large apparatus employing among other things a combination of rotating wheels and shafts, a micrometer, adjustment assemblies, and scratching pins.

The technology relating to splitting of ribbonized electrical conduits similarly does not aid in solving the problem of splitting ribbonized fiber optic cables, because such technology has likewise not been sufficiently sensitive to the deleterious effects of scratching caused by cutting and scoring apparatus on optical fibers as compared with electrical conductors. Imperfections created on the surface of electrically conductive materials, such as copper, aluminum, silver, gold and platinum, do not impair the function of the conductor to any appreciable degree. Such conductors are quite ductile and malleable, and retain these properties after being subject to splitting operations. By contrast, optical fibers are brittle and exquisitely prone to breaking. Moreover, there has been no need to focus on the problem of scratching in the electrical conductor art because scratching does not impair the conductive function. For example, scratching usually does not change the cross-sectional area of electrical conductors to an extent significant enough to alter resistivity or rate of heat dissipation.

Accordingly, it is an object of the present invention to provide a simple, economical, non-chemical solution to the problem of breaking out discrete optical fibers from optical fiber ribbons and of separating those ribbons into subgroups of fibers. In furtherance of this object, preferred embodiments of the present invention will now be described.

SUMMARY OF THE INVENTION

According one embodiment, a fiber optic cable ribbon breakout apparatus comprises first and second die members disposed in opposing relationship to each other. Each die member has a plurality of slots formed into one its surfaces which are adapted to receive a portion of the optical ribbon. For each die member, each slot has depth differing from the depths of the other slots of that member in order to effect a break out of the ribbon at any fiber desired. The slots of the second die member may have a width greater than that of the slots of the first die member.

A frame is provided which includes a first side member and a second side member to contain the die members. Each side member has a keyway into which corresponding keys located at the ends of the die members may be slidably engaged. The first die member is adapted for translational displacement between the side members. A spring is provided to bias the first die member against one of the side members. In this biased position, the corresponding slots of the die members are opposingly aligned to permit containment of a single fiber optic cable ribbon. The keys on the ends of the second die member have different dimensions in order to ensure proper alignment of the slots. Translational displacement of the first die member relative to the second die member causes the first portion of a cable ribbon loaded into the apparatus to separate from the remaining portion of the ribbon at a desired point.

In another embodiment, a fiber optic cable ribbon breakout apparatus comprises a holding member and a cutting member. The holding member has a plurality of slots formed into one its surfaces which are adapted to receive a first portion of the cable ribbon. Each slot of the holding member has depth differing from the depths of the other slots of that member in order to effect a break out of the ribbon at any fiber desired. The cutting member has a single slot that, when placed in opposing alignment with a slot of the holding member, is adapted to receive a second portion of the cable ribbon. After a cable ribbon has been loaded into the apparatus, translational displacement of the cutting member relative to the holding member causes the first portion of a cable ribbon to separate from the second portion of the cable ribbon.

To assist in guiding the cutting member across the holding member and to increase the precision of the splitting operation, a system of channels may be incorporated into the surface of the holding member that includes the slots. Transverse channels may be formed in parallel with the slots of the holding member, such that each slot has an adjacent channel on both sides of the slot. One or more longitudinal channels may extend in the direction perpendicular to that of the transverse channels and slots. The longitudinal channels extend across the surface of the holding member a great enough distance so as to communicate with each transverse channel. Protrusions are provided on the surface of the cutting member on both sides of the slot of the cutting member. These protrusions are intended to movably engage the channels to guide the cutting member along the surface of the holding member.

Other features and advantages of the invention will be apparent from the following specification taken in conjunction with the following drawings.

BRIEF DESCRIPTION OF THE DRAWINGS

FIG. 2 is a front view of a lower die according to one embodiment of the present invention.

FIG. 3 is a top view of a lower die according to one embodiment of the present invention.

FIG. 4 is a front view of an upper die according to one embodiment of the present invention.

FIG. 5 is a bottom view of an upper die according to one embodiment of the present invention.

FIG. 6 is a front view of one embodiment of the present invention completely assembled and in an initial state.

FIG. 7 is a front view of one embodiment of the present invention completely assembled and after completion of the breakout step.

DETAILED DESCRIPTION OF THE PREFERRED EMBODIMENT

Figure 1:
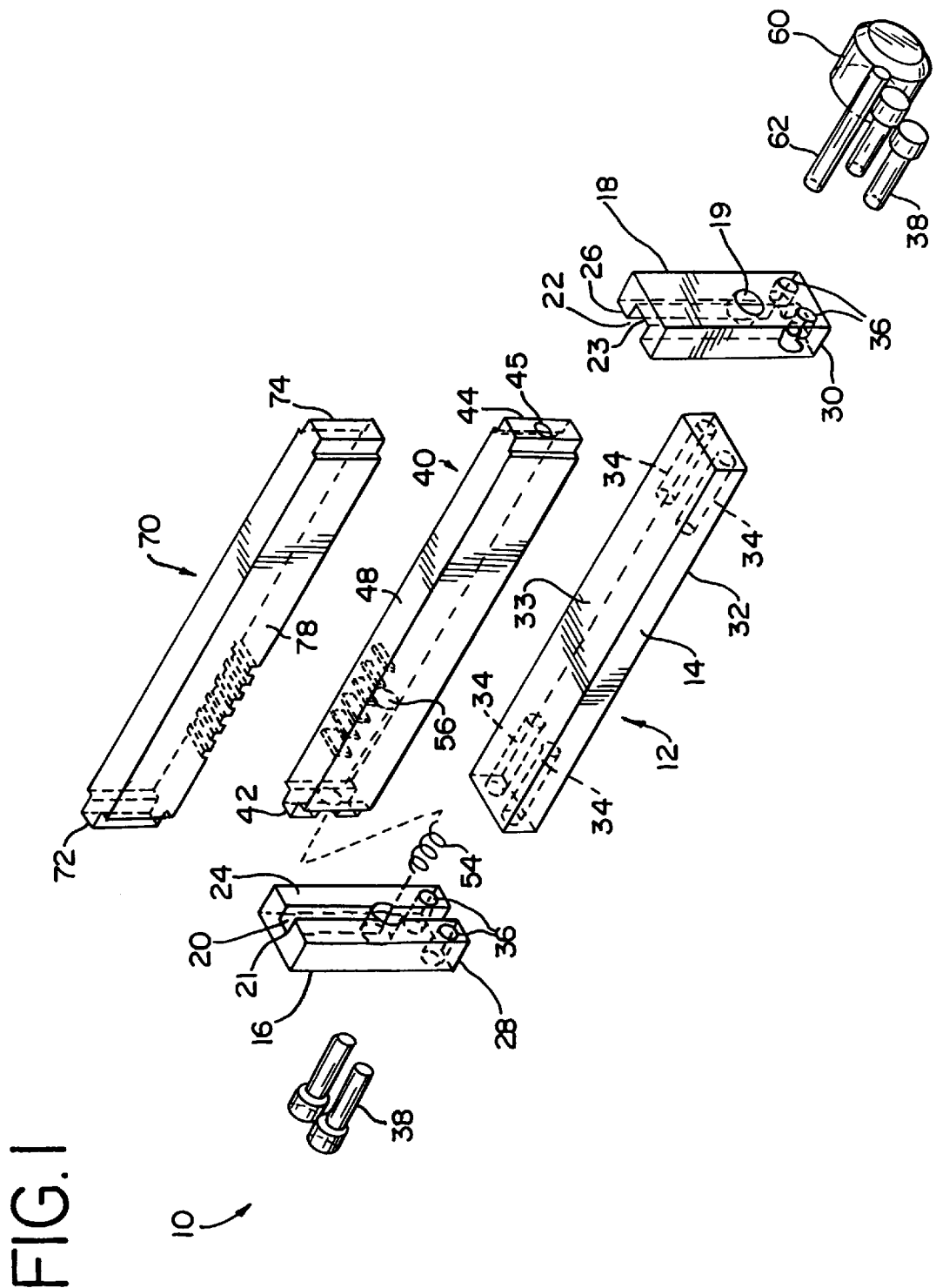
FIG. 1 is a perspective exploded view showing various components of one embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

First Embodiment

The first embodiment of the present invention will be described with reference to FIGS. 1–8.

FIG. 1 shows in exploded view a preferred embodiment of the ribbon breakout tool 10. The tool 10 is generally characterized by a pair of die members or beams 40,70 having opposing slotted surfaces 48,78. A preferred configuration of the assembled tool 10 specifies an upper die 70 removably mounted within a frame subassembly 12, and a lower die 40 mounted below the upper die 70 but capable of translational movement within the frame subassembly 12. The dies 40,70 and the structural members of the frame subassembly 12 may be constructed from anodized aluminum or other material having suitable properties. The tool 10 of the present embodiment is designed to be hand-held, preferably having an overall length of approximately 4.5", a height of approximately 1.25", and a width of approximately 0.50". The tool 10 is preferably assembled as follows.

The frame subassembly 12 includes a base member or block 14 and two side members or blocks 16,18. Each side block 16,18 has a vertically disposed channel or keyway 20,22 machined into its inside surface 24,26. The frame subassembly 12 is constructed by fastening the side blocks 16,18 on either side of the base block 14 such that the bottom surfaces 28,30 of the side blocks 16,18 are flush with the bottom surface 32 of the base block 14. A convenient fastening method is to provide one or more threaded bores 34 extending longitudinally into each side of the base block 14, and one or more corresponding throughbores 36 extending through the sides of the left and right side blocks 16,18. Once the throughbores 36 of the side blocks 16,18 are aligned with the threaded bores 34 of the base block 14, knurled set screws 38 or other suitable fasteners may be inserted through the throughbores 36 and threaded into threaded bores 34. It will be understood that many other equivalent fastening methods may be employed for providing a suitable structural frame for the dies 40,70 of the tool 10.

The lower die 40 has a key 42,44 formed on each of the sides of the lower die 40. The keys 42,44 are sized such that the left key 42 fits into the left keyway 20 of the left side block 16 and the right key 44 fits into the right keyway 22 of the right side block 18. As best illustrated in FIG. 2, the lower die 40 also a has a series of precision-cut notches or slots 46 extending into the lower die 40 from the upper surface 48 of the lower die 40. Each slot 46 of the lower die 40 has a depth different from the depths of the other slots 46 of the lower die 40. In the present embodiment there are six slots 46, labeled 1–6; Slot 1 has the greatest depth, with the depths of Slots 2–6 decreasing incrementally. The preferred depths of Slots 1–6 are, respectively: 0.117", 0.109", 0.093", 0.083", 0.070", and 0.063", where the dimensions are accurate to within + or −0.001". The preferred width of each slot 46 is 0.015"×0.001". The function of the slots 46 will be explained below.

With the frame subassembly 12 having been constructed, the lower die 40 slides into the frame subassembly 12 and rests upon the upper surface 33 of the base block 14.

For the present embodiment, it is important that the lower die 40 be able to laterally move between the left and right side blocks 16,18. Thus, the length defined from the outermost edge 50 of the left key 42 of the lower die 40 to the outermost edge 52 of the right key 44 should be less than the length defined from the innermost surface 21 of the left keyway 20 of the left side block 16 to the innermost surface 23 of the right keyway 22. However, the length of the lower die 40 should also be great enough to prevent the lower die 40 from falling out of the keyways 20,22. For instance, when the lower die 40 is displaced at an extreme position, such as when the right key 44 is completely inserted into the right keyway 22, a portion of the left key 42 should remain in the left keyway 20. When the tool 10 is in its initial, biased position (to be described below), the portion of the left key 42 remaining in the left keyway 20 is represented by an interference distance $I_L$ shown in FIG. 6. Similarly, after the breakout operation has been performed (to be described below), the portion of the right key 44 remaining in the right keyway 22 is represented by an interference distance $I_R$ shown in FIG. 7.

Preferably, means are provided for biasing the lower die 40 at the initial extreme position. The embodiment of FIGS. 1–7 is exemplified as biased in the right-hand position. For this purpose a spring 54 having a suitable spring rate is disposed within a bore 56 extending from the outermost edge 50 of the left key 42 into the left side of the lower die 40. One end of the spring 54 contacts the innermost surface 21 of the left keyway 20, and the other end is seated within the lower die 40. To facilitate translational movement of the lower die 40 within the frame subassembly 12, a knurled knob 60 is provided at which a force may be applied to overcome the opposing force of the biasing spring 54. It is preferable to fixedly mount the head of a set screw 62 within the knob 60, such as by spline or press-fit, pass the threaded portion of the knobbed set screw 62 through a second bore 19 extending through the right side block 18, and thread the knobbed set screw 62 into a threaded bore 45 extending into the right key 44 of the lower die 40.

Like the lower die 40, the upper die 70 has left and right keys 72,74 adapted for slidable insertion into the keyways 20,22 of the side blocks 16,18. Unlike the lower die 40, however, the length of the upper die 70 from left key 72 to right key 74 should be such as to permit negligible or no translational movement of the upper die 70 between the side blocks 16,18. As best illustrated in FIG. 4, the upper die 70 has a series of precision-cut notches or slots 76 extending into the upper die 70 from the lower surface 78 of the upper die 70. As will be explained below with reference to FIGS. 6 and 7, each upper die slot 76 cooperates with a corresponding slot 46 on the lower die 40, with the number of upper die slots 76 equalling the number of lower die slots 46. The depths of the upper die slots 76 increase incrementally as the depths of the lower die slots 46 decrease. Thus, the upper die slot 76 corresponding to lower die Slot 1 has the least depth and the upper die slot 76 corresponding to lower die Slot 6 has the greatest depth. The preferred depths of the upper die slots 76 are, respectively: 0.015", 0.019", 0.029", 0.038", 0.056", and 0.067", where the dimensions are accurate to within + or −0.001". The preferred width of each upper die slot 76 is 0.038"±0.001".

FIG. 6 shows the upper die 70 installed into the frame subassembly 12, with the lower surface 78 of the upper die 70 preferably resting upon the upper surface 48 of the lower die 40. In this initial position, the spring 54 biases the lower die 40 fully against the right side block 18, with either a shoulder portion 58 or the outermost edge 52 of the right key 44 (see FIG. 3) contacting a surface of the right side block 18. In this initial biased position, the slots 76 of the upper die 70 are opposingly aligned with the slots 46 of the lower die 40. As previously indicated, fiber optic cable ribbons 80 may contain twelve fibers (as in FIG. 8, end view 1) or twenty-four fibers (not shown). Thus, it will be understood that the upper and lower dies 70,40 of the present invention may be equipped to perform breakout operations on either type of cable ribbon. For twelve-fiber ribbons 80, the upper and lower dies 70,40 preferably have six corresponding slots 76,46, as shown in FIGS. 1–7. For twenty-four-cable ribbons (not shown), each die 70,40 preferably has twelve slots. To render the same tool 10 capable of operating on both types of cable ribbons, the tool 10 may be equipped with a set of interchangeable six- and twelve-slotted upper and lower dies 70,40.

In accordance with the present invention, a preferred method for separating optical fibers 82 from the matrix 84 of a twelve-fiber optic cable ribbon 80 (see FIG. 8) will now be described. The method may be practiced by employing the ribbon breakout tool 10 disclosed above. Additionally, the method may be practiced at any splice location, including mid-span, in-line, balloon or mass spliced locations. Finally, the method will be described with reference to the "BELLCORE" Optical Code followed by persons in the telecommunications industry, which relates the number of the fiber 82 to the color of its coating as follows:

| FIBER | COLOR |
| --- | --- |
| Fiber 1 | Blue |
| Fiber 2 | Orange |
| Fiber 3 | Green |
| Fiber 4 | Brown |
| Fiber 5 | Slate |
| Fiber 6 | White |
| Fiber 7 | Red |
| Fiber 8 | Black |
| Fiber 9 | Yellow |
| Fiber 10 | Violet |
| Fiber 11 | Rose |
| Fiber 12 | Aqua |

Figure 8:
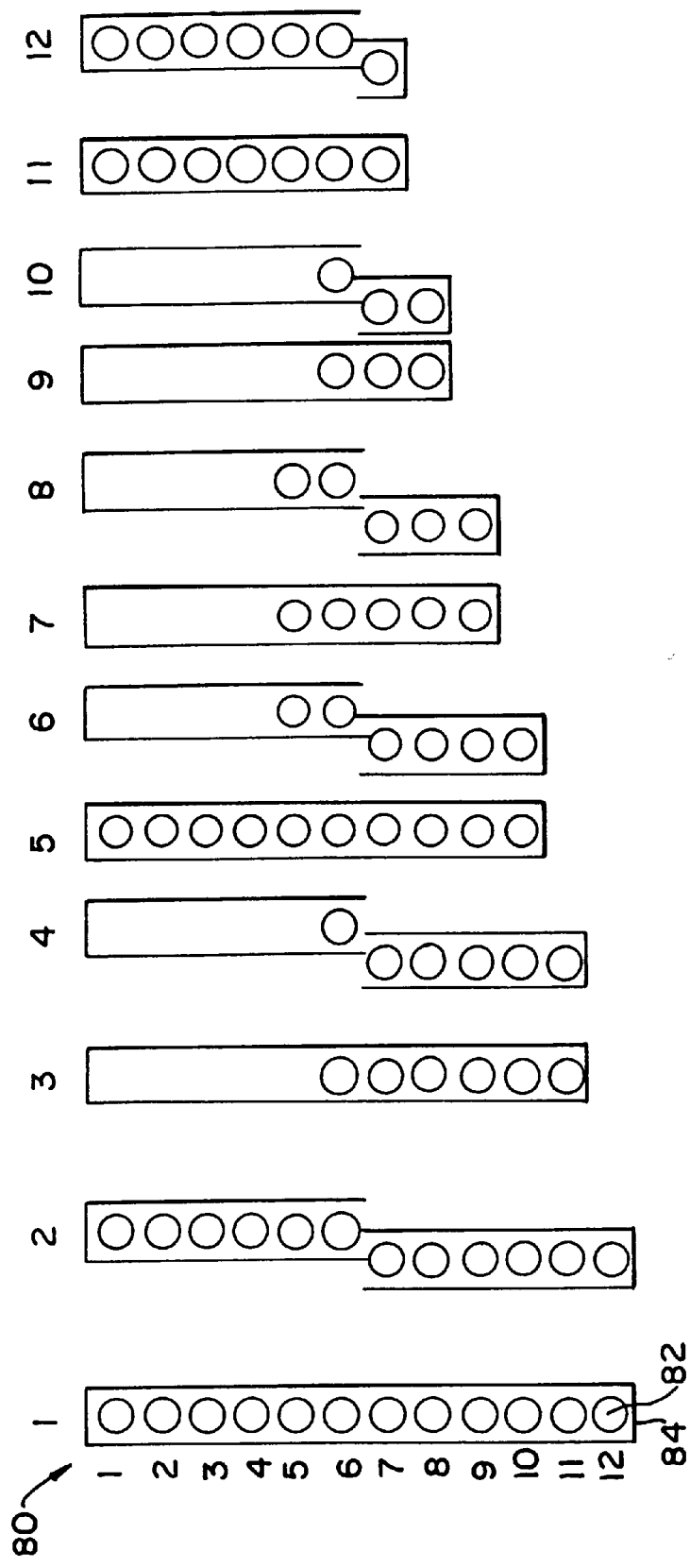
FIG. 8 is a series of end views of a ribbonized fiber optic cable ribbon showing various divisional states achieved by practice of the present invention.

As evident from FIG. 8, the number assigned to a fiber 82 or its color determines that fiber's location within the matrix 84 of the ribbon 80.

The technician or operator of the tool 10 must first positively identify the appropriate ribbon 80 in the protective conduit (not shown) and fiber or fibers 82 in the ribbon 80 to be accessed, using known methods such as red lasers, 2-KHz optical tone sets and fiber optic traffic indicators. Once the fiber or fibers 82 of interest are found, the technician removes the upper die 70 from the tool 10 and selects the appropriate slot 46 on the lower die 40 into which the ribbon 80 is to be loaded. The particular end 86,88 of the ribbon 80 that is to be loaded first into that slot 46 must also be determined (i.e., the end 86,88 nearest Fiber 1 or Fiber 12). For the orientation of the present embodiment, these decisions are based on the following criteria:

Slot 6 separates the ribbon 80 between Fibers 6 and 7 (white and red);

Slot 5 separates the ribbon 80 between Fibers 5 and 6 (slate and white) or Fibers 7 and 8 (red and black);

Slot 4 separates the ribbon 80 between Fibers 4 and 5 (brown and slate) or Fibers 8 and 9 (black and yellow);

Slot 3 separates the ribbon 80 between Fibers 3 and 4 (brown and green) or Fibers 9 and 10 (violet and yellow);

Slot 2 separates the ribbon 80 between Fibers 2 and 3 (green and orange) or Fibers 10 and 11 (violet and rose); and, Slot 1 separates the ribbon 80 between Fibers 1 and 2 (orange and blue) or Fibers 11 and 12 (rose and aqua).

The slots 46 on the lower die 40 are sized such that once the ribbon 80 has been loaded into the appropriate slot 46, an upper portion of the ribbon 80 is exposed above the upper surface 48 of the lower die 40. The exposed upper portion is the portion that is to be separated or sheared away from the lower portion of the ribbon 80 loaded in the slot 46 of the lower die 40. The respective depths of the slots 46 given earlier in the disclosure determine how much of the ribbon 80 is exposed for separation.

After loading the ribbon 80 into the appropriate slot 46, the technician then installs the upper die 70 into the tool 10. In order to ensure that the upper die slots 76 are properly aligned with the lower die slots 46 and to avoid damaging the exposed portion of the ribbon 80, the left keys 42,72 and left keyway 20 of the present embodiment have dimensions different from the right keys 44,74 and right keyway 22 (as shown in FIGS. 1, 3 and 5). With the upper die 70 is installed, both the upper and lower portions of the ribbon 80 at some point along the ribbon's length are completely contained within the chosen pair of cooperating slots 46,76 of the tool 10. As evident in FIGS. 1–7, the upper die slots 76 are wider than the lower die slots 46. This greater width facilitates installation of the upper die 70 about the exposed portion of the loaded ribbon 80 with minimal risk of damage to the ribbon 80. It also allows the exposed portion a small degree of translational play during the splitting operation, which has been found to facilitate a clean breakout of the ribbon 80 at the intended location.

The ribbon 80 having been fully loaded, the tool 10 may be held in the hand of the technician or placed on a surface. The technician then pushes the knob 60 against the opposing force of the spring 54. As shown in FIG. 7, pushing the knob 60 causes the lower die 40 to displace toward the left side block 16 while the upper die 70 remains in a fixed position. Concomitantly, the lower die slots 46 shift to the left and come out of alignment with the upper die slots 76, including the lower die slot 46 carrying the lower portion of the ribbon 80. The upper portion of the ribbon 80 is then forced into contact with the leading edge 77 of its upper die slot 76, and breaks away in reaction to the continued leftward movement of the lower portion carried in the lower die 40. After break away is accomplished and the force on the knob 60 released, the spring 54 will return the lower die 40 to its biased position (FIG. 6).

FIG. 8 illustrates some of the combinations or divisional states that may be obtained by practicing the present invention. In FIG. 8, each even-numbered end view of the fiber optic cable ribbon 80 shows the result of a splitting operation performed on the ribbon 80 having the initial state of the preceding odd-numbered end view. For example, the ribbon 80 in end view 2 results from an splitting operation performed on the ribbon 80 in end view 1, the ribbon 80 in end view 4 results from an splitting operation performed on the ribbon 80 in end view 3, and so on. It will be understood that the particular divisional state of the ribbon 80 desired—e.g., individual fibers 82 or grouped subsets of fibers 82—may be the result of one or more of the splitting operations described above.

In addition, many splicing operations are performed much more frequently than others. For instance, a technician may encounter a repetitive problem which always requires that a twelve-fiber ribbon 80 be split into two groups of six fibers 82, or three groups of four fibers 82, or some other common divisional state. In such a case, the tool 10 disclosed above may be modified to effect the specific divisional state. Therefore, the present invention contemplates a set of dedicated upper and lower dies (not shown) each having a only single slot sized for the frequently visited task.

It will be further understood that an analogous method to that described herein may be practiced on twenty-four cable ribbons (not shown) without departing from the scope of the present invention.

Second Embodiment

The second embodiment according to the present invention will be described with reference to FIGS. 8–13. The structural details of the second embodiment are illustrated in FIGS. 9–13, which depict an alternative embodiment capable of splitting a fiber optic cable ribbon 80 into combinations or divisional states similar to those shown in FIG. 8. As in the case of the description of the first embodiment, the following description is specifically directed by example toward performing splitting operations on a standard twelve-fiber ribbon 80 while generally directed and applying by analogy to a twenty-four-fiber ribbon.

The tool 100 of the second embodiment is sized to be hand-held, with an overall length of approximately 4.5", a height of approximately 3.0", and a width of approximately 2.0".

Figure 9:
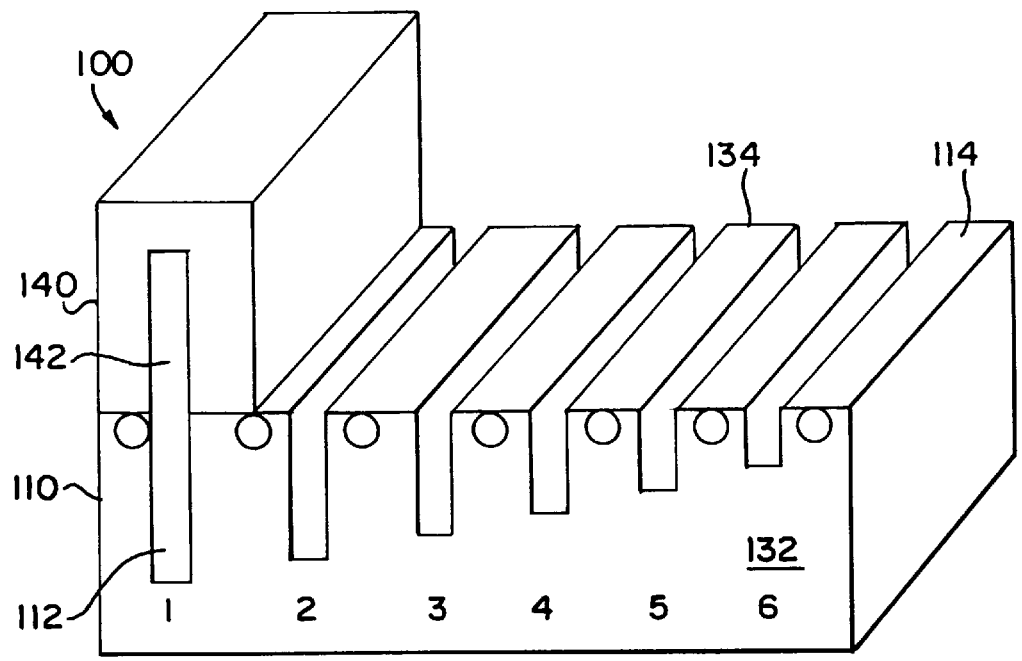
FIG. 9 is a perspective view of a second embodiment of the present invention.
Figure 10:
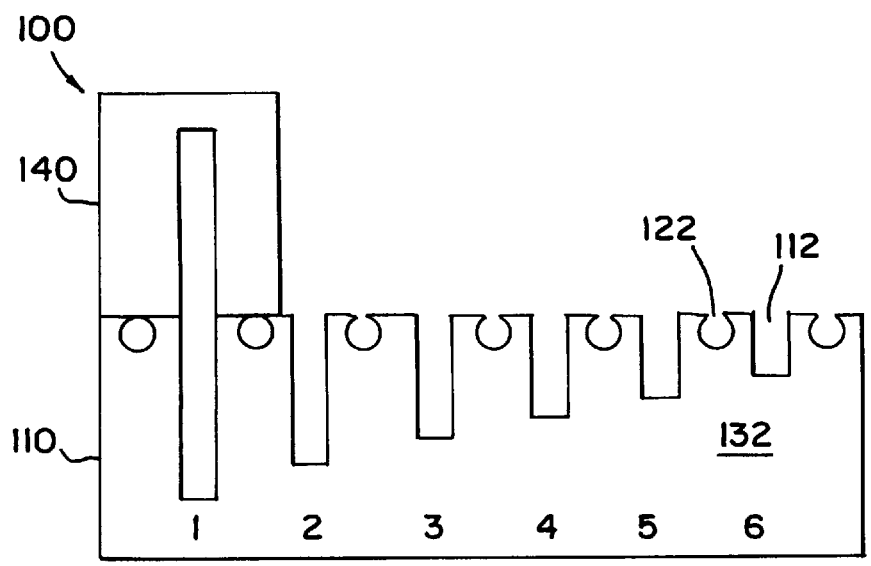
FIG. 10 is a front view of a second embodiment of the present invention.

Referring to FIGS. 9 and 10, the tool 100 is generally characterized the cooperation of a holding block or member 110 and a cutting block or member 140. The holding and cutting members 110,140 are constructed from anodized aluminum or other suitable material. In the preferred embodiment, the holding member 110 has a series of six precision-cut notches or slots 112, labeled 1–6. Slots 1–6 of the holding member 110 have depth and width dimensions similar to the dimensions of Slots 1–6 of the lower die 40 of the first embodiment disclosed above. The cutting member 140 is mounted above the holding member 110, and preferably has a single slot 142. The width of the cutting member slot 142 is similar to the width of the slots 76 of the upper die 70 of the first embodiment disclosed above. The depth of the slot 142 is such as to adequately contain the exposed portion of a ribbon 80 loaded into the shallowest slot 112 of the holding member 110, i.e., Slot 6 as depicted in FIGS. 9 and 10. A depth of 0.132"±0.00111" has been found suitable for the slot 142 of the cutting member 140.

The breakout or splitting operation is performed by loading a ribbon 80 into an appropriate slot 112 in the holding member 110, placing the cutting member 140 over the exposed portion of the ribbon 80, and sliding the cutting member 140 along the upper surface 114 of the holding member 110 in a direction transverse to the length of the ribbon 80.

Figure 11:
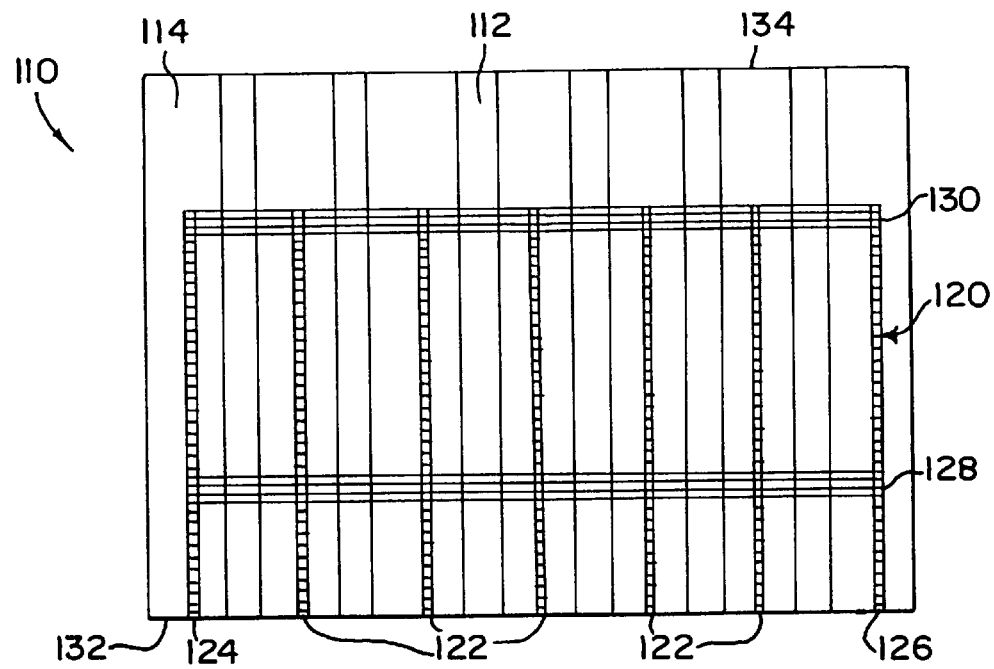
FIG. 11 is a top view of a second embodiment of the present invention with the cutting member removed to reveal guide channels.

To facilitate a precision breakout, a system 120 of guide channels is machined into the upper surface 114 of the holding member 140, as best shown in FIG. 11. For this purpose, transverse guide channels 122,124,126 are provided on either side of each slot 112 of the holding member 120. One or more longitudinal guide channels 128,130 extend perpendicularly between the two outermost transverse guide channels 124,126. In the preferred embodiment, the transverse guide channels 122,124,126 begin at the front face 132 of the holding member 110 and terminate at a point short of the rear face 134, with a second longitudinal guide channel 130 communicating with the terminal ends of the transverse guide channels 122,124,126.

Figure 12:
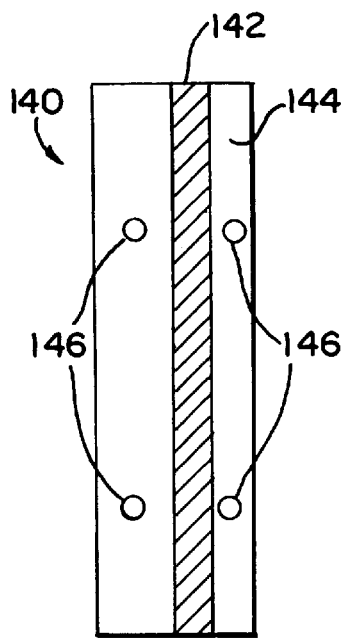
FIG. 12 is a bottom view of the cutting member of a second embodiment of the present invention showing a plurality of guide tongues.
Figure 13:
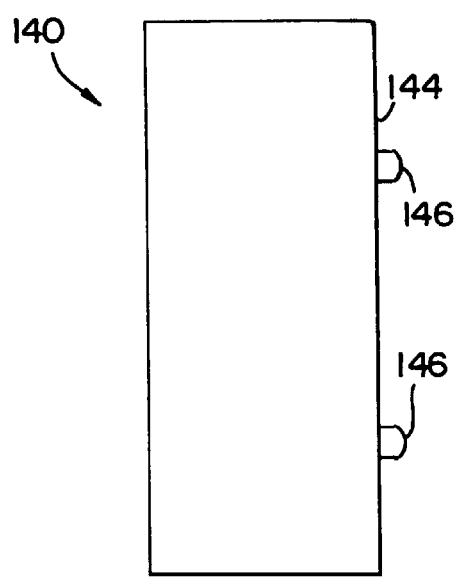
FIG. 13 is a side view of the cutting member of FIG. 12.

The lower surface 144 of the cutting member 140 is provided with protrusions or guide tongues 146 for engagement with the system 120 of guide channels, as shown in FIGS. 12 and 13. Thus, after a ribbon 80 has been loaded into a slot 112 of the holding member 110, the guide tongues 146 permit the cutting member 140 to be properly positioned on the holding member 110 about the exposed portion of the ribbon 80. With the guide tongues 146 engaging the transverse guide channels 122,124,126 adjacent to the loaded slot 112, the cutting member 140 is moved transversely across the upper surface 114 holding member 110 toward the rear face 134 until the guide tongues 146 contact the rear wall 131 of the second longitudinal guide channel 130. The cutting member 140 is then moved across the upper surface 114 of the holding member 110 along the longitudinal guide channels to effect a breakout at the desired location on the ribbon 80.

It will be understood that the utility of the second embodiment may be enhanced by providing a frame (not shown) or other supporting structure in relation to which the cutting member 140 travels.

While the specific embodiments have been illustrated and described, numerous modifications come to mind without significantly departing from the spirit of the invention, and the scope of protection is only limited by the scope of the accompanying claims.

What I claim is:

1. A fiber optic cable ribbon breakout apparatus comprising:

a first die member having a first surface and a slot extending from the first surface into the first die member, the slot adapted to receive a first portion of a cable ribbon; and, a second die member having a second surface and a slot extending from the second surface into the second die member, the second die member adapted for translational movement with respect to the first die member and the slot of the second die member adapted to receive a second portion of the cable ribbon, wherein translational movement of the second die member in a direction parallel to the first and second surfaces causes the first portion of a cable ribbon loaded into the slot of the first die member to separate from the second portion of the cable ribbon loaded into the slot of the second die member.

2. The apparatus of claim 1 further including means for positioning the slot of the first die member in opposing alignment with the slot of the second die member.

3. The apparatus of claim 1 further including:

a plurality of slots extending from the first surface into the first die member, each slot having a depth different than the depths of the other slots; and, a plurality of slots extending from the second surface into the second die member, each slot of the second die member having a depth different than the depths of the other slots of the second die member.

4. The apparatus of claim 3 further including means for positioning each slot of the first die member in opposing alignment with a corresponding slot of the second die member.

5. The apparatus of claim 3 wherein the width of the slots of the second die member is different from the width of the slots of the first die member.

6. The apparatus of claim 3 wherein the plurality of slots of the first die member is six and the plurality of slots of the second die member is six.

7. The apparatus of claim 3 wherein the plurality of slots of the first die member is twelve and the plurality of slots of the second die member is twelve.

8. The apparatus of claim 1 further including a first side member and a second side member, the first side member having a first keyway and the second side member having a second keyway.

9. The apparatus of claim 8 wherein the first die member has a first end and a second end, the first end including a first key adapted for sliding movement in the first keyway and the second end including a second key adapted for sliding movement in the second keyway, and wherein the second die member has a first end and a second end, the first end of the second die member including a first key adapted for removable insertion in the first keyway and the second end of the second die member including a second key adapted for removable insertion the second keyway.

10. The apparatus of claim 9 wherein the first key and the second key each have a cross-sectional area, wherein the cross-sectional area of the first key differs from the cross-sectional area of the second key.

11. The apparatus of claim 1 further including a spring contacting the first die member to influence the translational displacement of the first die member.

12. Apparatus for separating fibers in a fiber optic cable ribbon comprising:

a frame including a first side member and a second side member, the first side member having a first keyway and the second side member having a second keyway;

a first beam disposed between the first and second side members and adapted for translational displacement therebetween, the first beam having a first surface and a plurality of slots extending from the first surface into the first beam, each of the slots adapted to receive a first portion of a cable ribbon, and the first beam having a first end and a second end, the first end including a first key adapted for sliding movement in the first keyway and the second end including a second key adapted for sliding movement in the second keyway, the first key having a bore extending transversely through the first key;

a second beam disposed between the first and second side members, the second beam having a second surface and a plurality of slots extending from the second surface into the second beam, each of the slots adapted to receive a second portion of the cable ribbon, and the second beam having a first end and a second end, the first end including a first key adapted for removable insertion in the first keyway and the second end including a second key adapted for removable insertion the second keyway; and, a spring mounted in the bore of the first key between the first keyway and first beam to define a biased position wherein the first beam is biased toward the second side member and each slot of the first beam is opposingly aligned with a corresponding slot of the second beam, and wherein translational displacement of the first beam relative to the second beam causes the first portion of a cable ribbon loaded into a slot of the first beam to separate from the second portion of the cable ribbon loaded into a corresponding slot of the second beam.

13. The apparatus of claim 12 wherein each slot of the first beam has a depth different from the depths of the other slots.

14. The apparatus of claim 12 wherein the width of the slots of the second beam is different from the width of the slots of the first beam.

15. The apparatus of claim 12 wherein the first key and the second key each have a cross-sectional area, wherein the cross-sectional area of the first key differs from the cross-sectional area of the second key.

16. The apparatus of claim 12 wherein the plurality of slots of the first beam is six and the plurality of slots of the second beam is six.

17. The apparatus of claim 12 wherein the plurality of slots of the first beam is twelve and the plurality of slots of the second beam is twelve.

18. A fiber optic cable ribbon breakout apparatus comprising:

a holding member having a first surface and a slot extending from the first surface into the holding member, the slot adapted to receive a first portion of a cable ribbon; and, a cutting member having a second surface and a slot extending from the second surface into the cutting member, the slot adapted to receive a second portion of the cable ribbon, the second surface being in sliding contact with the first surface, wherein translational displacement of the cutting member relative to the holding member causes the first portion of a cable ribbon loaded into the slot of the cutting member to separate from the second portion of the cable ribbon loaded into the slot of the holding member.

19. The apparatus of claim 18 wherein the holding member has a plurality of slots extending into the holding member, each slot having a depth different from the depth of the other slots.

20. The apparatus of claim 19 wherein the plurality of slots in the holding member is six and the plurality of slots in the cutting member is six.

21. The apparatus of claim 19 wherein the plurality of slots in the holding member is twelve and the plurality of slots in the cutting member is twelve.

22. The apparatus of claim 19 wherein the holding member has a front side and a back side, the plurality of slots extending from the front side to the back side in parallel with a transverse axis, and the holding member has a longitudinal axis perpendicular to the transverse axis, the apparatus further including:

a plurality of transverse channels formed into the first surface in parallel with the slots of the holding member, the transverse channels extending from the front side to a distance along the transverse axis, wherein each slot of the holding member is disposed between two of the transverse channels;

at least one longitudinal channel formed into the first surface and extending in parallel with the longitudinal axis, the at least one longitudinal channel communicating with the transverse channels; and, a first tongue and second tongue, each tongue protruding from the second surface, wherein the slot of the cutting member is disposed between the first and second tongues, the tongues adapted for travel in the transverse channels and in the at least one longitudinal channel.

23. The apparatus of claim 22 wherein each transverse channel extends to a distance terminating at a point short of the back side.

24. The apparatus of claim 23 further including:

a first longitudinal channel and a second longitudinal channel, the first longitudinal channel communicating with the transverse channels at the respective terminating points of the transverse channels;

a first tongue and a second tongue, each tongue protruding from the second surface, wherein the slot of the cutting member is disposed between the tongue, the tongues adapted for travel in the transverse channels and in the first longitudinal channel; and, a third tongue and a fourth tongue, the third and fourth tongues each protruding from the second surface, wherein the slot of the cutting member is disposed between the third and fourth tongues, the third and fourth tongues adapted for travel in the transverse channels and in the second longitudinal channel.

* * * * *

UNITED STATES PATENT AND TRADEMARK OFFICE
CERTIFICATE OF CORRECTION

PATENT NO.    : 5,926,598
DATED         : July 20, 1999
INVENTOR(S)   : Dennis Klein It is certified that errors appear in the above-identified patent and that said Letters Patent is hereby corrected as shown below:

| Column | Line | Correction |
|--------|------|------------|
| 5 | 12 | Replace "x" with "+/-" |
| 8 | 63 | Replace "0.00111" with "0.001" |

Signed and Sealed this

Eighth Day of February, 2000

Attest:

Attesting Officer

Q. TODD DICKINSON

Commissioner of Patents and Trademarks